US012211636B2

(12) United States Patent
Chiyo et al.

(10) Patent No.: US 12,211,636 B2
(45) Date of Patent: Jan. 28, 2025

(54) COIL COMPONENT

(71) Applicant: TDK Corporation, Tokyo (JP)

(72) Inventors: Noritaka Chiyo, Tokyo (JP); Takuya Yoshida, Tokyo (JP)

(73) Assignee: TDK Corporation, Tokyo (JP)

( * ) Notice: Subject to any disclaimer, the term of this patent is extended or adjusted under 35 U.S.C. 154(b) by 939 days.

(21) Appl. No.: 17/188,218

(22) Filed: Mar. 1, 2021

(65) Prior Publication Data

US 2021/0272738 A1 Sep. 2, 2021

(30) Foreign Application Priority Data

Mar. 2, 2020 (JP) ................................ 2020-034770

(51) Int. Cl.
*H01F 27/28* (2006.01)
*H01F 38/14* (2006.01)

(52) U.S. Cl.
CPC ..... *H01F 27/2804* (2013.01); *H01F 27/2871* (2013.01); *H01F 38/14* (2013.01)

(58) Field of Classification Search
CPC ... H01F 27/2804; H01F 27/2871; H01F 38/14
USPC ........................................................ 336/200
See application file for complete search history.

(56) References Cited

U.S. PATENT DOCUMENTS 10,673,141 B2 6/2020 An et al.
2003/0179067 A1* 9/2003 Gamou .............. H01F 27/2804 336/223
2009/0179646 A1* 7/2009 Fath .................. G01R 33/3858 324/318
2011/0133877 A1 6/2011 Chiu et al.
2013/0328163 A1* 12/2013 Cheng ................ H01L 23/5227 438/381
2015/0280445 A1 10/2015 Yamakawa et al.
2016/0238731 A1 8/2016 Chopra et al.
2016/0241061 A1 8/2016 Werner et al.
2018/0174746 A1 6/2018 Ryu et al.
2019/0148053 A1 5/2019 Kaneko et al.
2020/0395168 A1* 12/2020 Ridler ............... A61N 1/37229

FOREIGN PATENT DOCUMENTS

CN 108123551 A * 6/2018 ......... H01F 27/2871
JP 2014-093795 A 5/2014
JP 2018-510599 A 4/2018
JP 2019-110308 A 7/2019

(Continued)

*Primary Examiner* — Shawki S Ismail
*Assistant Examiner* — Joselito S. Baisa
(74) *Attorney, Agent, or Firm* — Rimon P.C.

(57) ABSTRACT

Disclosed herein is a coil component that includes a coil pattern provided on the substrate. The outer and inner shapes of the coil pattern are both larger in width in a first direction than a second direction. The outer shape of the coil pattern has a pair of first outer shape sections and a second outer shape section positioned between the pair of first outer shape sections in the first direction and having a width in the second direction larger than that of the first outer shape sections. The inner shape of the coil pattern has a pair of first inner shape sections and a second inner shape section positioned between the pair of first inner shape sections in the first direction and having a width in the second direction larger than that of the first inner shape sections.

7 Claims, 9 Drawing Sheets

(56) References Cited

FOREIGN PATENT DOCUMENTS

| | | | | | |
|---|---|---|---|---|---|
| WO | WO-2012034520 | A1 | * | 3/2012 | ............. H01Q 1/243 |
| WO | 2016/158272 | A1 | | 10/2016 | |
| WO | 2020/158638 | A1 | | 8/2020 | |

* cited by examiner

| | Rin/Rout | Magnetic Coupling | | Change Ratio |
|---|---|---|---|---|
| | | free from offset | with 20mm offset | |
| Example 1 | 5 | 0.64 | 0.42 | 52% |
| Example 2 | 2.02 | 0.61 | 0.43 | 42% |
| Example 3 | 1.25 | 0.48 | 0.44 | 10% |
| Example 4 | 1.2 | 0.44 | 0.42 | 4% |
| Example 5 | 1.11 | 0.35 | 0.4 | −13% |
| Comparative Example 1 | − | 0.29 | 0.36 | −18% |

FIG. 10

COIL COMPONENT

BACKGROUND

Field

The present disclosure relates to a coil component and, more particularly, to a coil component that can be used for a wireless power transmission apparatus.

Description of Related Art

As a coil component that can be used for a wireless power transmission apparatus, a coil component described in JP 2014-93795A is known. The coil component described in JP 2014-93795A has a laterally-elongated power transmission coil so as to allow power transmission even when the positions of the power transmission coil and a power reception coil are laterally misaligned with each other.

However, in the coil component described in JP 2014-93795A, when no shift occurs in the relative position between the power transmission coil and the power reception coil, that is, when the center axis of the power transmission coil and that of the power reception coil are aligned, power transmission efficiency disadvantageously lowers.

SUMMARY

It is therefore an object of the present disclosure to provide a coil component capable of, when used for a wireless power transmission apparatus, exhibiting a high power transmission efficiency even in a state where the center axis of a power transmission coil and the center axis of a power reception coil are aligned with each other.

A coil component according to the present disclosure includes a substrate and a spiral-shaped first coil pattern provided on one surface of the substrate. The outer and inner shapes of the first coil pattern are both larger in width in a first direction than a second direction perpendicular to the first direction. The outer shape of the first coil pattern has a pair of first outer shape sections having a first outer width in the second direction and a second outer shape section positioned between the pair of first outer shape sections in the first direction and having a second outer width in the second direction that is larger than the first outer width. The inner shape of the first coil pattern has a pair of first inner shape sections having a first inner width in the second direction and a second inner shape section positioned between the pair of first inner shape sections in the first direction and having a second inner width in the second direction that is larger than the first inner width. An inner shape ratio which is a ratio of the second inner width relative to the first inner width is larger than an outer shape ratio which is a ratio of the second outer width relative to the first outer width.

BRIEF DESCRIPTION OF THE DRAWINGS

The above features and advantages of the present disclosure will be more apparent from the following description of certain preferred embodiments taken in conjunction with the accompanying drawings, in which:

FIG. 10 is a table for indicating measurement results of the examples.

DETAILED DESCRIPTION OF THE EMBODIMENTS

Preferred embodiments of the present disclosure will be explained below in detail with reference to the accompanying drawings.

Figure 1:
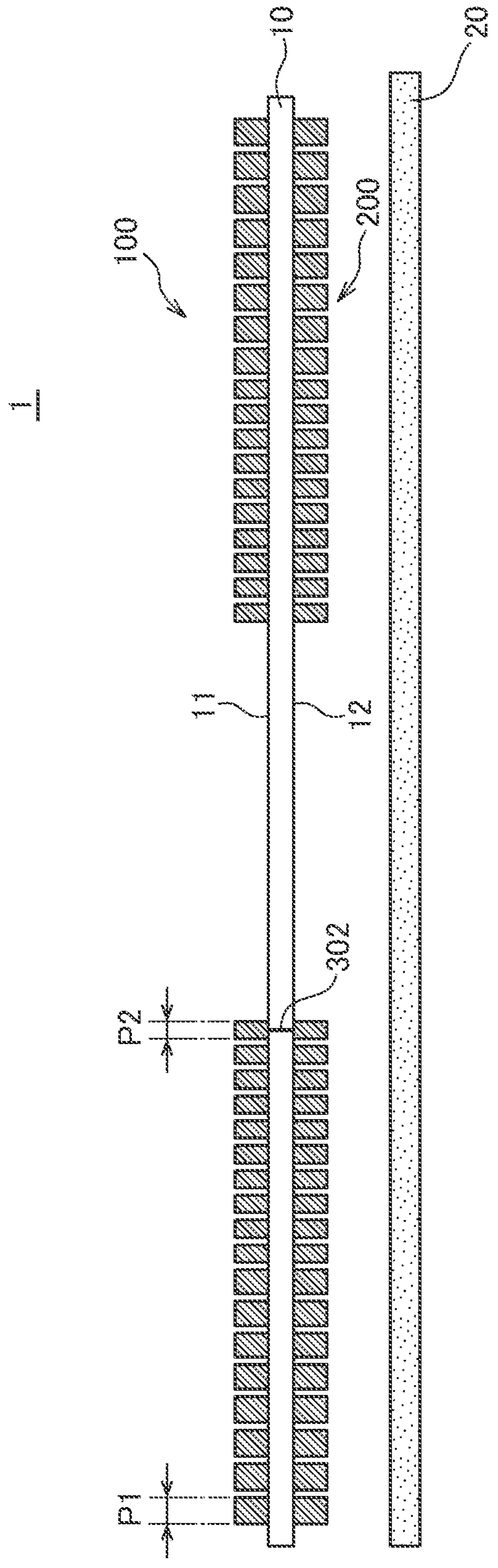
FIG. 1 is a schematic cross-sectional view illustrating the configuration of a coil component 1 according to an embodiment of the present disclosure.

FIG. 1 is a schematic cross-sectional view illustrating the configuration of a coil component 1 according to an embodiment of the present disclosure.

As illustrated in FIG. 1, the coil component 1 according to the present embodiment includes a substrate 10, a first coil pattern 100 formed on one surface (surface 11) of the substrate 10, and a second coil pattern 200 formed on the other surface (surface 12) of the substrate 10. Although details will be described later, the inner peripheral ends of the first coil pattern 100 and the inner peripheral ends of the second coil pattern 200 are connected to each other through a plurality of connection parts (only a connection part 302 appears in the cross section illustrated in FIG. 1) formed penetrating the substrate 10. When the coil component 1 according to the present embodiment is used as a power transmission coil for a wireless power transmission apparatus, it is disposed such that the surface 11 of the substrate 10 faces a power reception coil. In this case, a magnetic sheet 20 formed of a magnetic material such as ferrite is preferably disposed at the surface 12 side of the substrate 10.

Although there is no particular restriction on the material of the substrate 10, a transparent or translucent flexible insulating material, such as PET resin, can be used thereas. Alternatively, the substrate 10 may be a flexible substrate obtained by impregnating glass cloth with epoxy-based resin.

Figure 2:
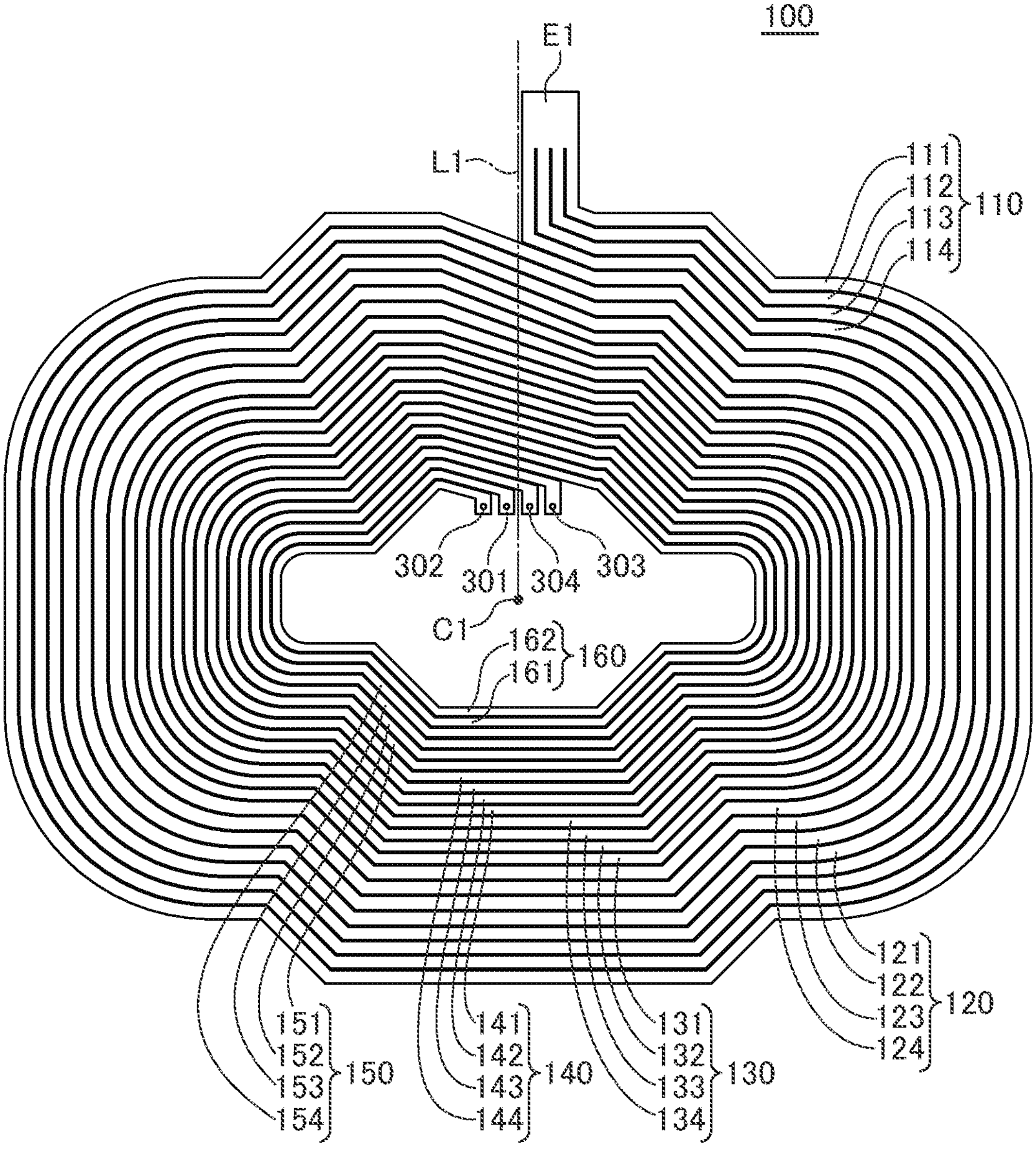
FIG. 2 is a plan view for explaining the pattern shape of the first coil pattern 100 as viewed from the side of the surface 11 of the substrate 10.

FIG. 2 is a plan view for explaining the pattern shape of the first coil pattern 100 as viewed from the side of the surface 11 of the substrate 10.

The first coil pattern 100 has a six-turn configuration constituted of turns 110, 120, 130, 140, 150, and 160, in which the turn 110 is the outermost turn positioned at the outermost peripheral side, and the turn 160 is the innermost turn positioned at the innermost peripheral side. Of these turns, the turns 110, 120, 130, 140, and 150 are each radially divided into four by three spiral-shaped slits. On the other hand, the turn 160 is radially divided into two by one spiral-shaped slit. Thus, the turn 110 is divided into four lines 111 to 114, the turn 120 is divided into four lines 121 to 124, the turn 130 is divided into four lines 131 to 134, the turn 140 is divided into four lines 141 to 144, the turn 150 is divided into four lines 151 to 154, and the turn 160 is divided into two lines 161 and 162.

The lines 111, 121, 131, 141, 151, and 161 are continuous lines spirally wound in six turns and are each the outermost line positioned at the outermost peripheral side in its corresponding turn. The lines 112, 122, 132, 142, 152, and 162 are continuous lines spirally wound in six turns and are each the second line counted from the outermost peripheral line in its corresponding turn. The lines 113, 123, 133, 143, and 153 are continuous lines spirally wound in five turns and are each the second line counted from the innermost peripheral line in its corresponding turn. The lines 114, 124, 134, 144, and 154 are continuous lines spirally wound in five turns and are each the innermost line positioned at the innermost peripheral side in its corresponding turn.

Although not particularly restricted, in the present embodiment, a pattern width P2 of each of the lines 131 to 134, 141 to 144, 151 to 154, 161, and 162 is smaller than a pattern width P1 of each of the lines 111 to 114 and 121 to 124. The "pattern width" refers to the radial width of a planar conductor.

The outer peripheral end of the first coil pattern 100 is constituted by the outer peripheral ends of the lines 111 to 114, which are connected in common to a terminal electrode E1. On the other hand, the inner peripheral end of the first coil pattern 100 is constituted by the inner peripheral ends of the lines 161, 162, 153, and 154, which are connected to connection parts 301 to 304, respectively.

As illustrated in FIG. 2, when a virtual line L1 radially extending from a center point C1 of the first coil pattern 100 is drawn, the connection parts 301 and 304 are disposed at positions symmetrical with respect to the virtual line L1, and the connection parts 302 and 303 are disposed at positions symmetrical with respect to the virtual line L1.

Figure 3:
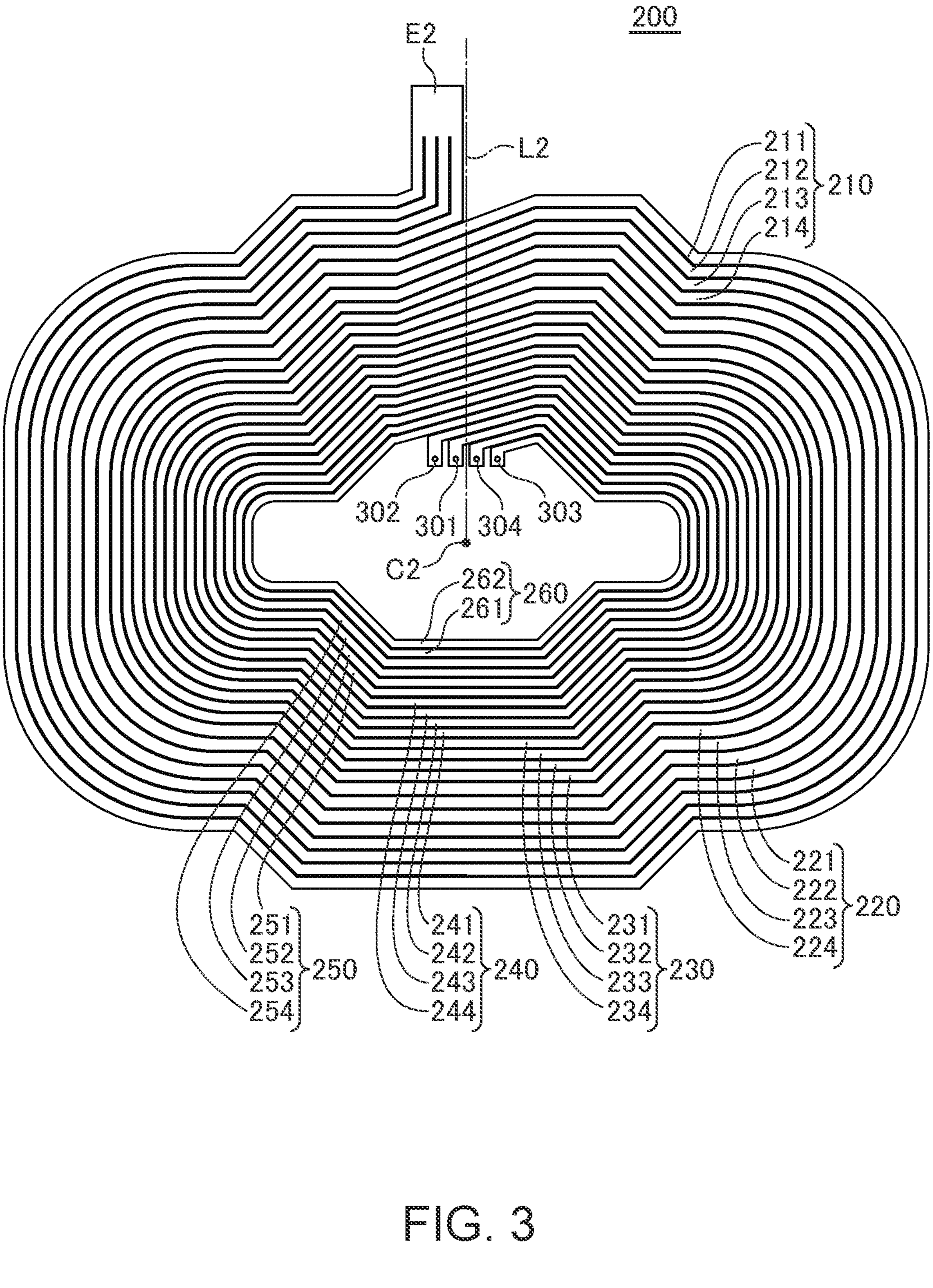
FIG. 3 is a plan view for explaining the pattern shape of the second coil pattern 200 as viewed from the side of the surface 11 of the substrate 10.

FIG. 3 is a plan view for explaining the pattern shape of the second coil pattern 200 as viewed from the side of the surface 11 of the substrate 10, seen through the substrate 10.

As illustrated in FIG. 3, the pattern shape of the second coil pattern 200 is the same as that of the first coil pattern 100. Thus, the first and second coil patterns 100 and 200 can be produced using the same mask, allowing a significant reduction in manufacturing cost.

The second coil pattern 200 has a six-turn configuration constituted of turns 210, 220, 230, 240, 250, and 260, in which the turn 210 is the outermost turn positioned at the outermost peripheral side, and the turn 260 is the innermost turn positioned at the innermost peripheral side. Of these turns, the turns 210, 220, 230, 240, and 250 are each radially divided into four by three spiral-shaped slits. On the other hand, the turn 260 is radially divided into two by one spiral-shaped slit. Thus, the turn 210 is divided into four lines 211 to 214, the turn 220 is divided into four lines 221 to 224, the turn 230 is divided into four lines 231 to 234, the turn 240 is divided into four lines 241 to 244, the turn 250 is divided into four lines 251 to 254, and the turn 260 is divided into two lines 261 and 262.

The lines 211, 221, 231, 241, 251, and 261 are continuous lines spirally wound in six turns and are each the outermost line positioned at the outermost peripheral side in its corresponding turn. The lines 212, 222, 232, 242, 252, and 262 are continuous lines spirally wound in six turns and are each the second line counted from the outermost peripheral line in its corresponding turn. The lines 213, 223, 233, 243, and 253 are continuous lines spirally wound in five turns and are each the second line counted from the innermost peripheral line in its corresponding turn. The lines 214, 224, 234, 244, and 254 are continuous lines spirally wound in five turns and are each the innermost line positioned at the innermost peripheral side in its corresponding turn.

Although not particularly restricted, in the present embodiment, a pattern width P2 of each of the lines 231 to 234, 241 to 244, 251 to 254, 261, and 262 is smaller than a pattern width P1 of each of the lines 211 to 214 and 221 to 224.

The outer peripheral end of the second coil pattern 200 is constituted by the outer peripheral ends of the lines 211 to 214, which are connected in common to a terminal electrode E2. On the other hand, the inner peripheral end of the second coil pattern 200 is constituted by the inner peripheral ends of the lines 261, 262, 253, and 254, which are connected to the connection parts 304, 303, 302, and 301, respectively.

As illustrated in FIG. 3, when a virtual line L2 radially extending from a center point C2 of the second coil pattern 200 is drawn, the connection parts 301 and 304 are disposed at positions symmetrical with respect to the virtual line L2, and the connection parts 302 and 303 are disposed at positions symmetrical with respect to the virtual line L2.

The thus configured first and second coil patterns 100 and 200 are formed on the front and back surfaces of the substrate 10 such that the center points C1 and C2 overlap each other and that the virtual lines L1 and L2 overlap each other.

Figure 4:
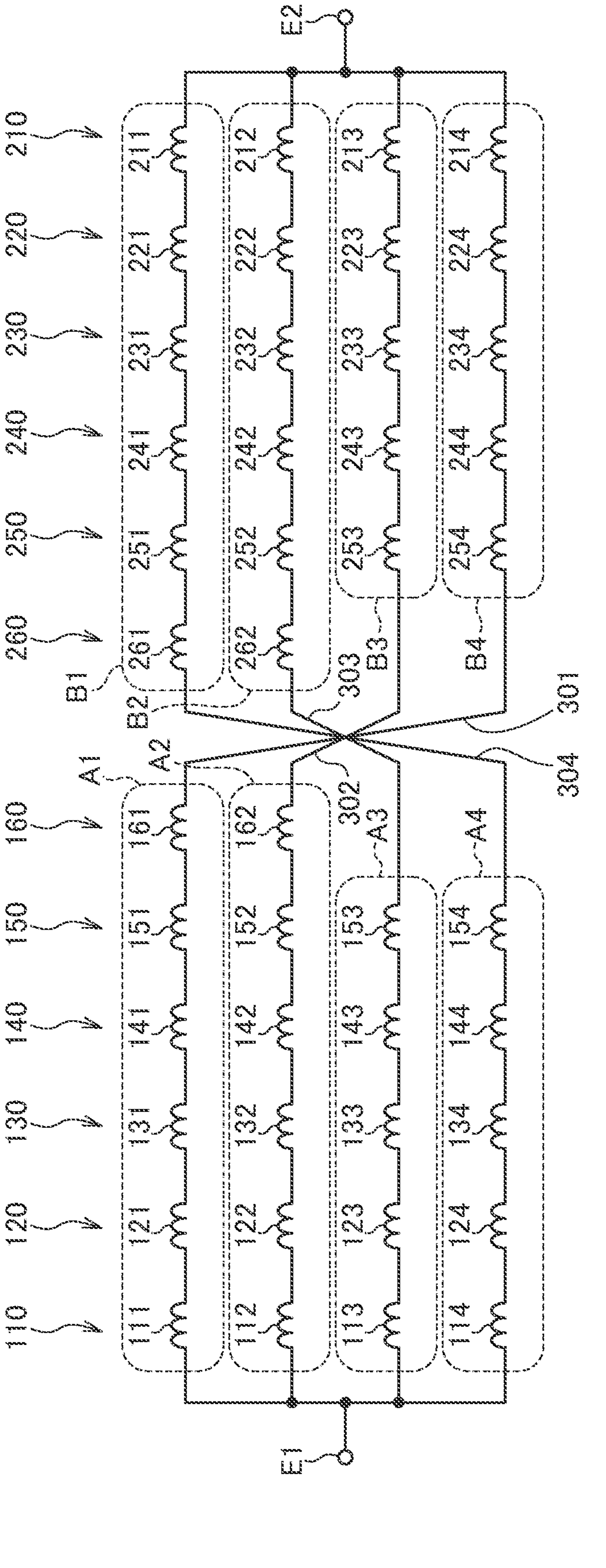
FIG. 4 is an equivalent circuit diagram of the coil component 1.

FIG. 4 is an equivalent circuit diagram of the coil component 1 according to the present embodiment.

As illustrated in FIG. 4, a line group A1 of six turns including the lines 111, 121, 131, 141, 151, and 161 and a line group B4 of five turns including the lines 214, 224, 234, 244, and 254 are connected in series to each other through the connection part 301 to constitute a continuous line wound in eleven turns in total. A line group A2 of six turns including the lines 112, 122, 132, 142, 152, and 162 and a line group B3 of five turns including the lines 213, 223, 233, 243, and 253 are connected in series to each other through the connection part 302 to constitute a continuous line wound in eleven turns in total. A line group A3 of five turns including the lines 113, 123, 133, 143, and 153 and a line group B2 of six turns including the lines 212, 222, 232, 242, 252, and 262 are connected in series to each other through the connection part 303 to constitute a continuous line wound in eleven turns in total. A line group A4 of five turns including the lines 114, 124, 134, 144, and 154 and a line group B1 of six turns including the lines 211, 221, 231, 241, 251, and 261 are connected in series to each other through the connection part 304 to constitute a continuous line wound in eleven turns in total.

Thus, four 11-turn lines are connected in parallel between the terminal electrodes E1 and E2. This makes uniform the density distribution of current flowing in the first and second coil patterns 100 and 200, allowing a reduction in DC resistance and AC resistance. In addition, in the present embodiment, the line group A1 which is the outermost peripheral group is connected to the line group B4 which is the innermost peripheral group, the line group A2 which is the second group counted from the outermost peripheral group is connected to the line group B3 which is the second group counted from the innermost peripheral group, the line group A3 which is the second group counted from the innermost peripheral group is connected to the line group B2 which is the second group counted from the outermost peripheral group, and the line group A4 which is the innermost peripheral group is connected to the line group B1 which is the outermost peripheral group. This cancels a difference between the inner and outer peripheries of the first coil pattern 100 and a difference between the inner and outer peripheries of the second coil pattern 200, thereby allowing a further reduction in DC resistance and AC resistance. Further, the line groups A1, A2, B1, and B2 each have a six-turn configuration, and the line groups A3, A4, B3, and B4 each have a five-turn configuration, so that the total number of turns can be an odd number even though the first and second coil patterns 100 and 200 formed on the front and back surfaces of the substrate 10 have the same pattern shape.

Figure 5:
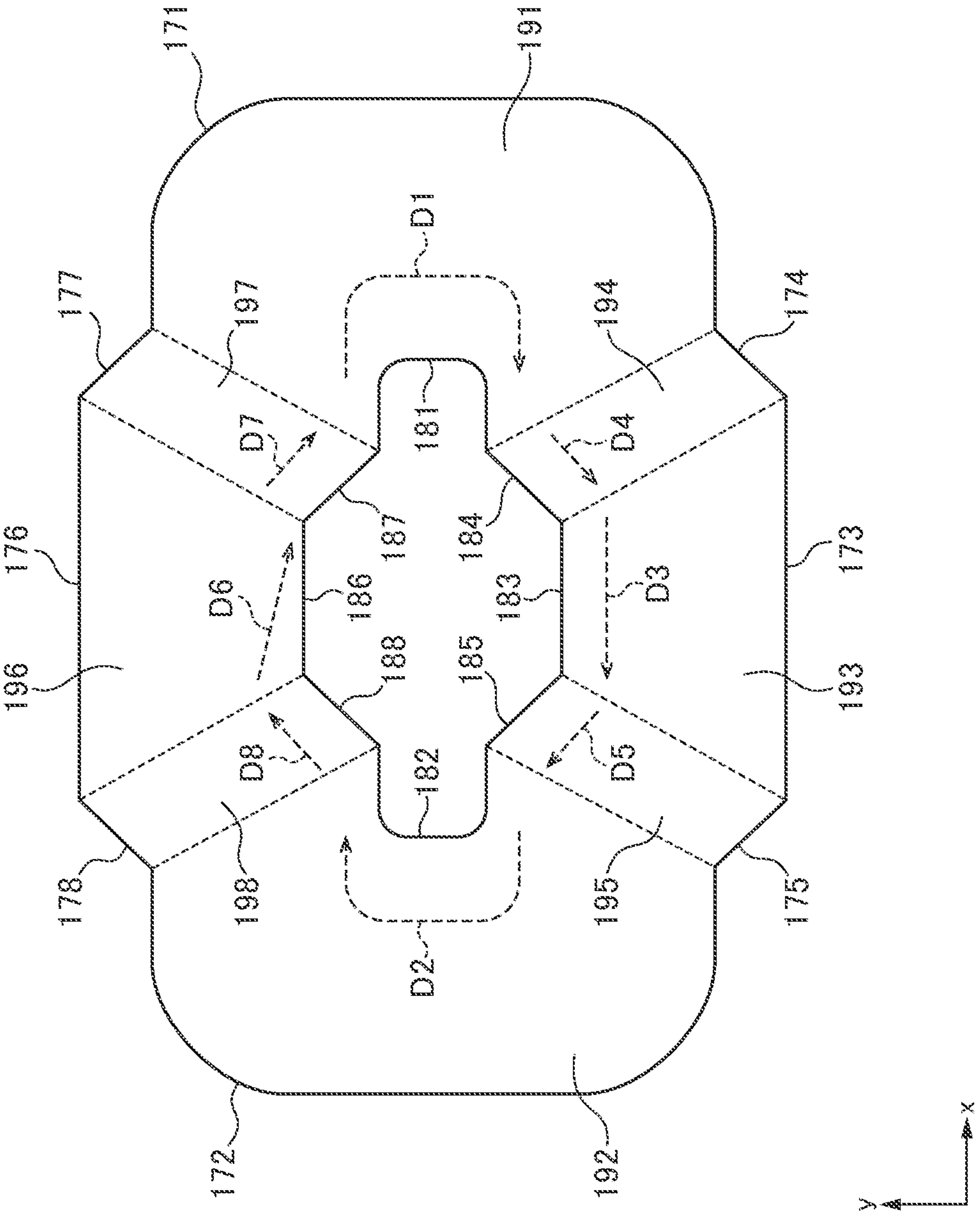
FIG. 5 is a schematic plan view for explaining the outer shape and inner shape of the first coil pattern 100.

FIG. 5 is a schematic plan view for explaining the outer shape and inner shape of the first coil pattern 100. The "outer shape" used herein refers to a shape following the outer peripheral edge of the outermost peripheral line 111, and the "inner shape" used herein refers to a shape following the inner peripheral edge of the innermost peripheral line 162. As described above, since the first and second coil patterns 100 and 200 have the same shape, the following description concerning the shape of the first coil pattern 100 also applies to the shape of the second coil pattern 200.

As illustrated in FIG. 5, the outer shape of the first coil pattern 100 includes outer shape sections 171 to 178, and the inner shape of the first coil pattern 100 includes inner shape sections 181 to 188. The area between the outer shape sections 171 to 178 and the inner shape sections 181 to 188 includes winding areas 191 to 198 in which the first coil pattern 100 is wound.

The winding areas 191 and 192 are each an area where the extending direction of the lines running from the outer peripheral end to the inner peripheral end (or from the inner peripheral end to the outer peripheral end) changes by 180°. For example, in the winding area 191, the line running in the positive x-direction changes by 90° in the extending direction to run in the negative y-direction and further changes by 90° in the extending direction to run in the negative x-direction (see the dashed arrow D1). Similarly, in the winding area 192, the line running in the negative x-direction changes by 90° in the extending direction to run in the positive y-direction and further changes by 90° in the extending direction to run in the positive x-direction (see the dashed arrow D2).

The winding area 193 is an area where the lines linearly extend in the negative x-direction (see the dashed arrow D3). The winding area 194 is an area positioned between the winding areas 191 and 193, where one ends of the lines in the winding area 191 and one ends of the lines in the winding area 193 are connected. In the winding area 194, the lines linearly extend at a predetermined angle (e.g., about 45° toward the negative y-direction) with respect to the negative x-direction (see the dashed arrow D4). The winding area 195 is an area positioned between the winding areas 192 and 193, where one ends of the lines in the winding area 192 and the other ends of lines in the winding area 193 are connected. In the winding area 195, the lines linearly extend at a predetermined angle (e.g., about 45° toward the positive y-direction) with respect to the negative x-direction (see the dashed arrow D5).

The winding area 196 is an area where the lines linearly extend at a predetermined angle (e.g., about 30° toward the negative y-direction) with respect to the positive x-direction (see the dashed arrow D6). The winding area 196 is a transition area serving as the boundary of each turn, where each turn obliquely extends in the negative y-direction by an amount corresponding to the width of one turn. The winding area 197 is an area positioned between the winding areas 191 and 196, where the other ends of the lines in the winding area 191 and one ends of the lines in the winding area 196 are connected. In the winding area 197, the lines linearly extend at a predetermined angle (e.g., about 45° toward the negative y-direction) with respect to the positive x-direction (see the dashed arrow D7). The winding area 198 is an area positioned between the winding areas 192 and 196, where the other ends of the lines in the winding area 192 and the other ends of the lines in the winding area 196 are connected. In the winding area 198, the lines linearly extend at a predetermined angle (e.g., about 45° toward the positive y-direction) with respect to the positive x-direction (see the dashed arrow D8).

Figure 6:
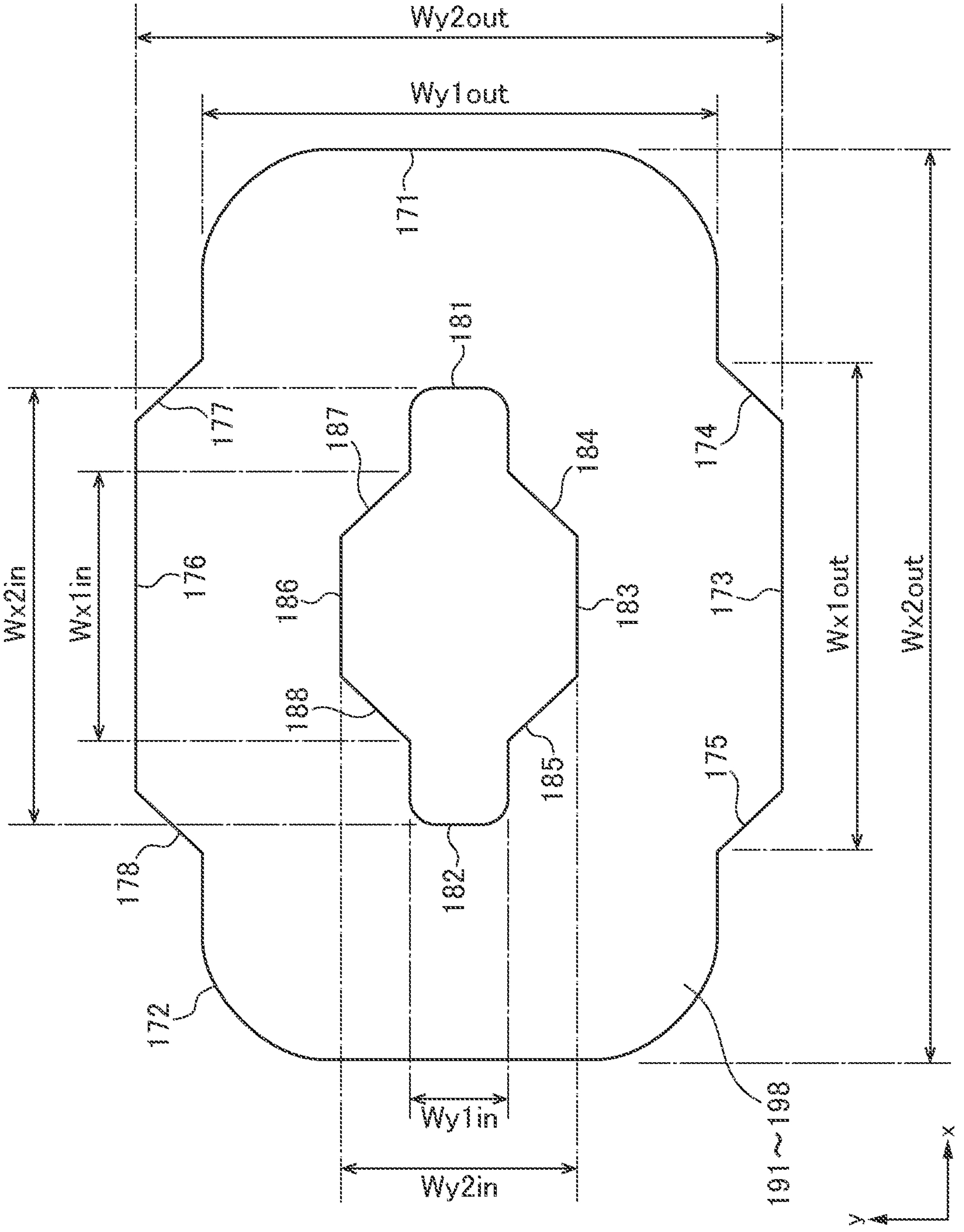
FIG. 6 is a schematic plan view for explaining the shapes of the winding areas 191 to 198.

FIG. 6 is a schematic plan view for explaining the shapes of the winding areas 191 to 198.

As illustrated in FIG. 6, assuming that the outer width of the entire winding area (including the winding areas 191 to 198) in the x-direction is Wx2out, and that the outer width of the entire winding area (including the winding areas 191 to 198) in the y-direction is Wy2out, the coil component 1 according to the present embodiment satisfies Wx2out>Wy2out. That is, the outer shape of the coil component 1 is laterally elongated such that the dimension thereof in the x-direction is larger than the dimension thereof in the y-direction. The outer width Wx2out is defined by the distance between the outer shape sections 171 and 172 in the x-direction, and the outer width Wy2out is defined by the distance between the outer shape sections 173 and 176 in the y-direction.

Assuming that the inner width of the winding areas 191 to 198 in the x-direction is Wx2in, and that the inner width of the winding areas 191 to 198 in the y-direction is Wy2in, the coil component 1 according to the present embodiment satisfies Wx2in>Wy2in. That is, the inner shape of the coil component 1 is laterally elongated such that the dimension thereof in the x-direction is larger than the dimension thereof in the y-direction. The inner width Wx2in is defined by the distance between the inner shape sections 181 and 182 in the x-direction, and the inner width Wy2in is defined by the distance between the inner shape sections 183 and 186 in the y-direction.

The coil component according to the present embodiment is deformed such that the winding area partially bulges in the positive or negative y-direction. Specifically, the winding area 193 is deformed in the negative y-direction with respect to the winding areas 191 and 192, and the winding area 196 is deformed in the positive y-direction with respect to the winding areas 191 and 192. The winding areas 194 and 195 in each of which the deformation amount linearly changes from the outer peripheral end to inner peripheral end (or from the inner peripheral end to the outer peripheral end) are disposed between the winding areas 191, 192 and the winding area 193. Similarly, the winding areas 197 and 198 in each of which the deformation amount linearly changes from the outer peripheral end to the inner peripheral end (or from the inner peripheral end to the outer peripheral end) are disposed between the winding areas 191, 192 and the winding area 196.

As described above, the winding areas 193 to 195 are each deformed so as to bulge in the negative y-direction, and the winding areas 196 to 198 are each deformed so as to bulge in the positive y-direction. On the other hand, the winding areas 191 and 192 are not deformed in the positive y-direction or negative y-direction. Thus, assuming that the outer width of each of the winding areas 191 and 192 in the y-direction is Wy1out, the coil component 1 according to the present embodiment satisfies Wy2out>Wy1out. The outer width Wy1out is defined by the width of each of the outer shape sections 171 and 172 in the y-direction.

Similarly, assuming that the inner width of each of the winding areas 191 and 192 in the y-direction is Wy1in, the coil component 1 according to the present embodiment satisfies Wy2in>Wy1in. The inner width Wy1in is defined by the width of each of the inner shape sections 181 and 182 in the y-direction. Further, the outer width of the sum of the outer shape sections 173 to 175 (or the outer shape sections 176 to 178) in the x-direction is Wx1out, and the inner width of the sum of the inner shape sections 183 to 185 (or the inner shape sections 186 to 188) in the x-direction is Wx1in.

Assuming that the ratio of the outer width Wy2out relative to the outer width Wy1out is set as an outer shape ratio Rout (=Wy2out/Wy1out) and that the ratio of the inner width Wy2in relative to the inner width Wy1in is set as an inner shape ratio Rin (=Wy2in/Wy1in), the coil component 1 according to the present embodiment satisfies Rin>Rout. That is, the rate at which the inner shape of the coil component 1 bulges in the y-direction is higher than the rate at which the outer shape of the coil component 1 bulges in the y-direction. This sufficiently increases the inner width Wy2in while suppressing increase in the outer width Wy2out, which makes it possible to enlarge the inner shape of the coil component 1 while suppressing an increase in the entire size of the coil component 1.

Figure 7A:
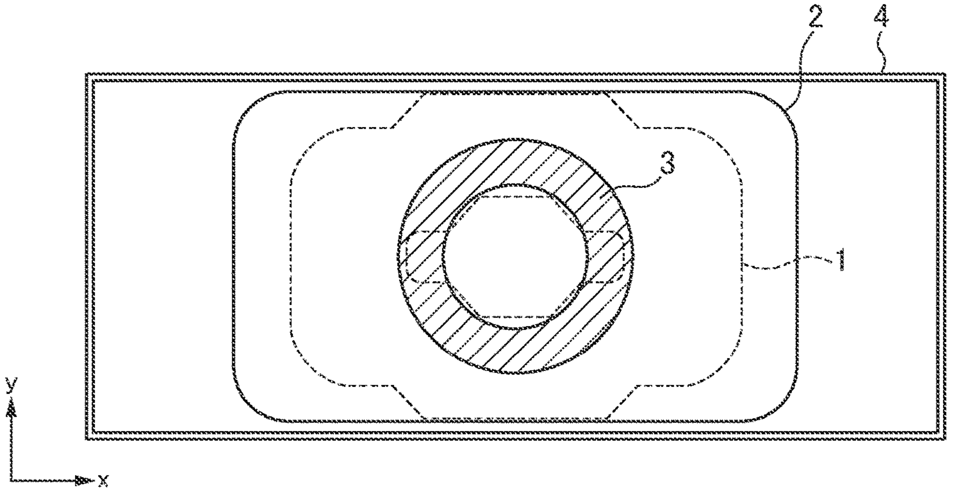
FIGS. 7A to 7C are each a schematic plan view for explaining the positional relationship between the center axis of a power transmission coil and the center axis of a power reception coil when the coil component 1 is used as a power transmission coil for a wireless power transmission apparatus.
Figure 7B:
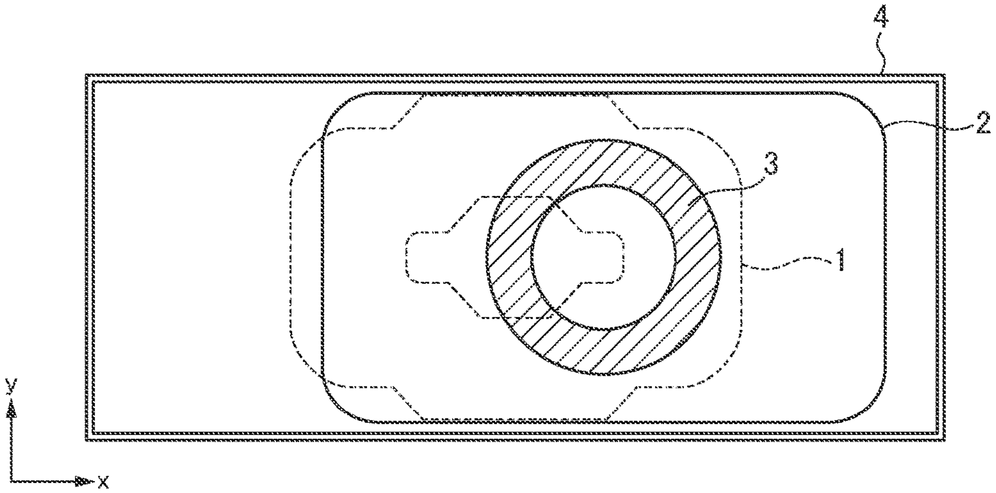
Figure 7C:
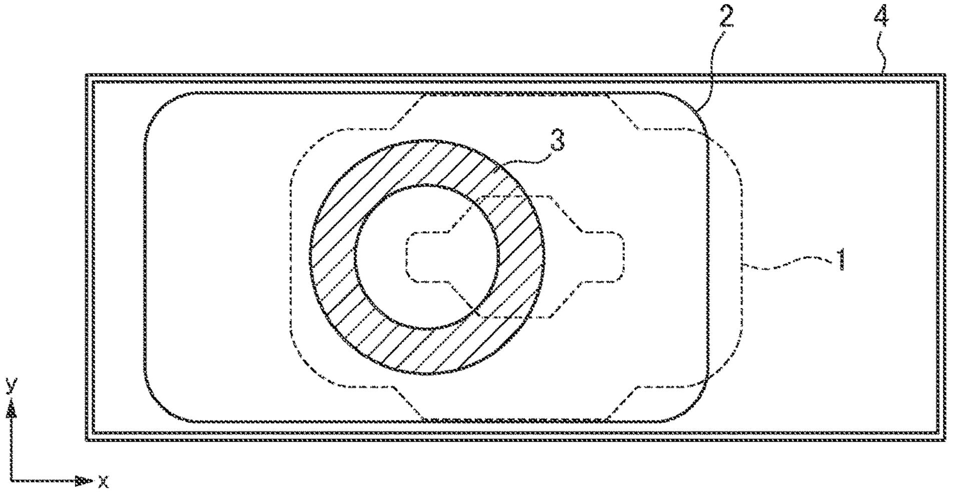

FIGS. 7A to 7C are each a schematic plan view for explaining the positional relationship between the center axis of a power transmission coil and the center axis of a power reception coil when the coil component 1 according to the present embodiment is used as a power transmission coil for a wireless power transmission apparatus.

In the example illustrated in FIGS. 7A to 7C, the coil component 1 is embedded at the center portion of a frame body 4 in the x-direction. When a mobile electronic device 2 is placed on a placing area surrounded by the frame body 4, it is charged wirelessly. Such wireless power transmission is performed through the coil component 1 according to the present embodiment and a power reception coil 3 incorporated in the mobile electronic device 2.

The inner size of the frame body 4 in the y-direction is designed substantially equal to or slightly larger than the outer size of the mobile electronic device 2 in the y-direction. Thus, when the mobile electronic device 2 is placed on the frame body 4, the mobile electronic device 2 in the y-direction with respect to the frame body 4 is positioned at the center without being significantly displaced therefrom. On the other hand, the inner size of the frame body 4 in the x-direction is designed significantly larger than the outer size of the mobile electronic device 2 in the x-direction. Thus, when the mobile electronic device 2 is placed on the frame body 4, the position of the mobile electronic device 2 in the x-direction with respect to the frame body 4 can significantly varies.

As illustrated in FIG. 7A, when the mobile electronic device 2 is placed at substantially the center of the frame body 4 in the x-direction, the center axis of the coil component 1 serving as a power transmission coil and the center axis of the power reception coil 3 are substantially aligned with each other, so that magnetic flux generated from the coil component 1 interlinks with the power reception coil 3, thereby allowing wireless power transmission.

On the other hand, when the mobile electronic device 2 is placed offset in the positive x-direction (to the right) as illustrated in FIG. 7B, or when the mobile electronic device 2 is placed offset in the negative x-direction (to the left) as illustrated in FIG. 7C, the center axis of the coil component 1 serving as a power transmission coil and the center axis of the power reception coil 3 are misaligned. However, in the coil component 1 according to the present embodiment, the outer width Wx2out is larger than the outer width Wy2out, and the inner width Wx2in is larger than the inner width Wy2in, so that even when the center axis of the coil component 1 and the center axis of the power reception coil 3 are misaligned in the x-direction, magnetic flux generated from the coil component 1 can be made to interlink with the power reception coil 3. Thus, it is possible to perform wireless power transmission properly regardless of the position of the mobile electronic device 2 within the frame body 4.

Figure 8:
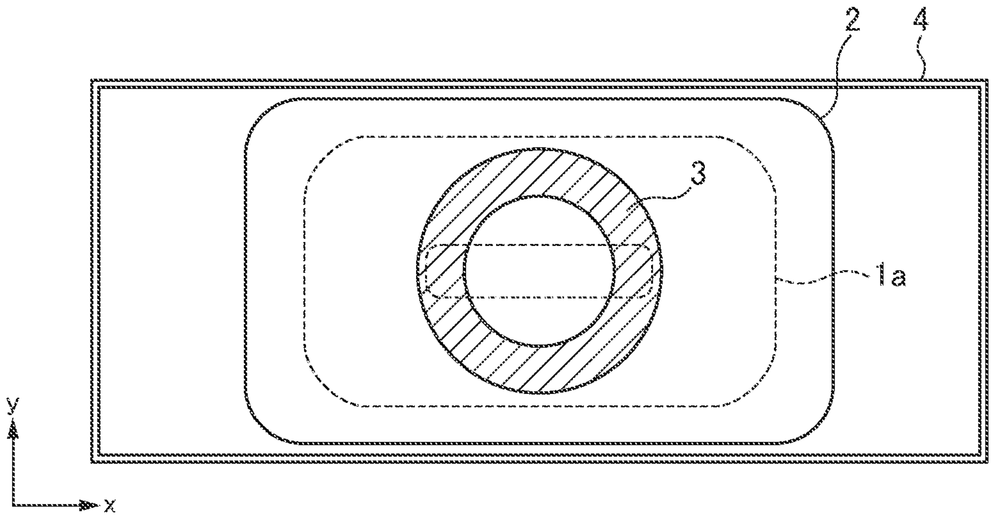
FIG. 8 is a schematic plan view for indicating an example in which the coil component 1*a* according to a comparative example is used in place of the coil component 1 as a power transmission coil for a wireless power transmission apparatus.

As illustrated in FIG. 8 as a comparative example, a coil component 1*a* has a configuration in which the winding area does not partially bulge in the positive and negative y-directions. That is, the coil component 1*a* has a shape obtained by simply elongating the outer and inner shapes in the x-direction. When the thus configured coil component 1*a* is used, power transmission efficiency may lower in a state where the center axis of the coil component 1*a* and the center axis of the power reception coil 3 are substantially aligned with each other.

Figure 9:
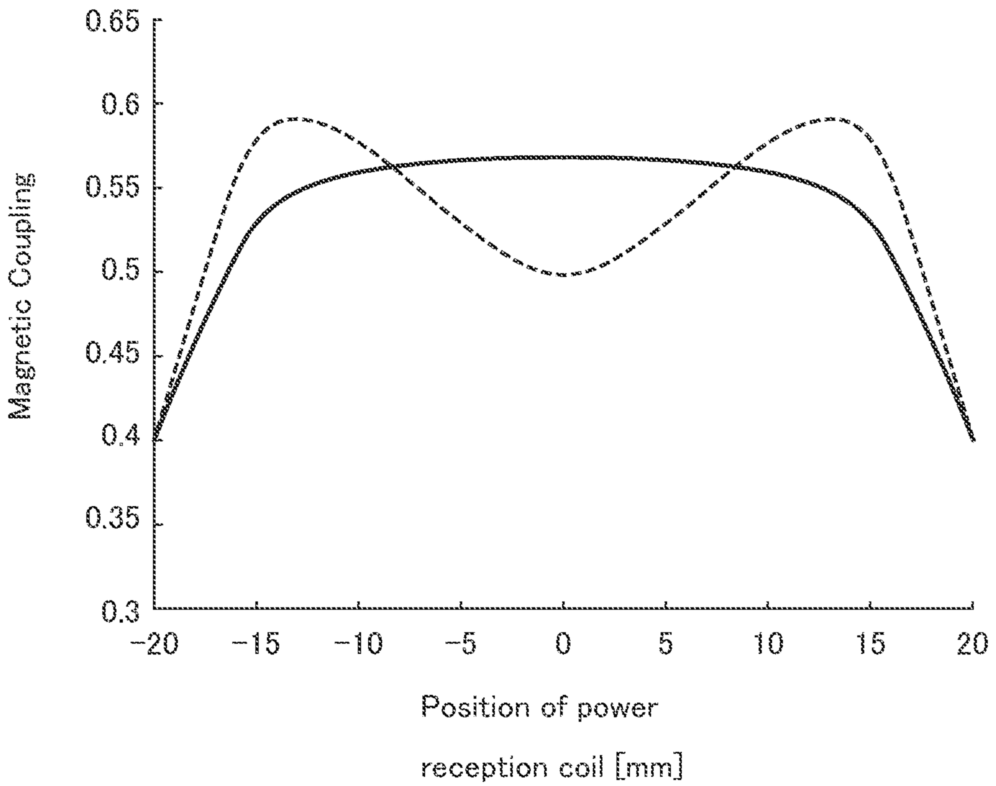
FIG. 9 is a graph comparing the coil component 1 according to the embodiment and the coil component 1*a* according to the comparative example in terms of power transmission efficiency and illustrates the relationship between the offset amount of the power reception coil 3 and a magnetic coupling.

FIG. 9 is a graph comparing the coil component 1 according to the present embodiment and the coil component 1*a* according to the comparative example in terms of power transmission efficiency and illustrates the relationship between the offset amount of the power reception coil 3 and a magnetic coupling. The solid curve in FIG. 9 denotes the characteristics of the coil component 1 according to the present embodiment, and the dashed curve in FIG. 9 denotes the characteristics of the coil component 1*a* according to the comparative example.

As illustrated in FIG. 9, in the coil component 1 according to the present embodiment, a constant magnetic coupling can be obtained in a wide range regardless of the offset amount in the x-direction, while in the coil component 1*a* according to the comparative example, the magnetic coupling significantly lowers when the offset amount in the x-direction is small (that is, when the center axis of the coil component 1*a* and the center axis of the power reception coil 3 are substantially aligned with each other). The reason that such a phenomenon occurs is as follows. The magnetic flux passing through the inner diameter area of the coil becomes high in density particularly at the edge portion of the inner diameter area, so that, in the coil component 1*a* according to the comparative example, when the offset amount in the x-direction is small, the edge of the inner diameter area of the coil component 1*a* that overlaps the inner diameter area of the power reception coil 3 is insufficient in number.

Considering this, the coil component 1 according to the present embodiment is deformed such that, at the center portion thereof in the x-direction, the center portion of the winding area in the x-direction is made to bulge both in the positive and negative y-directions. Thus, even when the center axis of the coil component 1 and the center axis of the power reception coil 3 are substantially aligned with each other as illustrated in FIG. 7A, the edge of the inner diameter area of the coil component 1 that overlaps the inner diameter area of the power reception coil 3 increases in number. As a result, as illustrated in FIG. 9, flat characteristics (constant magnetic coupling) can be obtained in a wide range.

As described above, when being used as a power transmission coil for a wireless power transmission apparatus, the coil component 1 according to the present embodiment can perform wireless power transmission even in a state where the center axis of the coil component 1 and the center axis of the power reception coil 3 are misaligned in the x-direction. To sufficiently obtain this effect, the inner width Wx2in is preferably designed larger than the inner width Wy2in. In addition, in the coil component 1 according to the present embodiment, the magnetic coupling does not significantly lower even when the center axis of the coil component 1 and the center axis of the power reception coil 3 are substantially aligned with each other, allowing flat characteristics to be obtained. In particular, in the present embodiment, Rin>Rout is satisfied, so that a sufficient magnetic coupling can be obtained when the center axis of the coil component 1 and the center axis of the power reception coil 3 are substantially aligned with each other.

To make the inner shape ratio Rin larger than the outer shape ratio Rout, the winding length defined by the distance between the outer shape section 176 and the inner shape section 186 in the y-direction may be increased, for example. In this case, when the pattern width of each turn is simply increased, an eddy current loss may be increased. However, in the present embodiment, each turn is radially divided into a plurality of lines by spiral slits, so that the pattern width of each line is not so large to thereby suppress increase in eddy current loss.

Further, in the coil component 1 according to the present embodiment, the lines linearly obliquely extend in the winding areas 194, 195, 197, and 198, making it possible to suppress change in magnetic coupling with respect to a change in the offset amount from the power reception coil 3 in the x-direction. That is, when the lines extend in the y-direction in the winding areas 194, 195, 197, and 198, the magnetic coupling abruptly changes by a slight change in the offset amount in the x-direction, while in the present embodiment, the lines do not extend in the y-direction in the winding areas 194, 195, 197, and 198 but linearly obliquely extend, so that the magnetic coupling does not abruptly change with a change in the offset amount in the x-direction.

Further, in the coil component 1 according to the present embodiment, the length of each of the lines in the winding areas 194, 195, 197, and 198 is smaller than the length of each of the lines in the winding areas 193 and 196. The winding areas 194, 195, 197, and 198 are each a section required to enlarge the diameter in the y-direction, and an increase in the length of the section makes the size of the entire coil component 1 larger than necessary.

Further, in the coil component 1 according to the present embodiment, the pattern width P2 is smaller than the pattern width P1, so that a loss due to heat generation by an eddy current is also reduced. That is, a reduction in the pattern width P1 at the inner peripheral side reduces the magnetic flux that interferes with the inner peripheral side lines having a high flux density, thus making it possible to reduce generation of an eddy current.

Further, the pattern thickness of the conductor pattern may be smaller in the innermost turn than in the outermost turn. Preferably, the pattern thickness is reduced gradually or stepwise from the outermost turn toward the innermost turn. This makes conspicuous a loss reduction effect obtained by reducing the pattern width at the inner peripheral side that receives the influence of the eddy current more strongly.

It is apparent that the present disclosure is not limited to the above embodiments, but may be modified and changed without departing from the scope and spirit of the disclosure.

For example, although the first and second coil patterns 100 and 200 are formed on the front and back surfaces of the substrate 10 in the above embodiment, this is not essential in the present disclosure. Further, a plurality of sets of the first and second coil patterns 100 and 200 may be made to overlap and be connected in parallel to increase current flowing between the terminal electrodes E1 and E2.

Further, although each of the turns constituting the first and second coil patterns 100 and 200 is divided into the four lines by the spiral-shaped slits in the present embodiment, such division is not essential in the present disclosure. Further, the number of divisions is not limited to four.

As described above, according to the present embodiment, the outer and inner shapes of the first coil pattern are enlarged in the first direction, so that when the coil component according to the present disclosure is used as a power transmission coil for a wireless power transmission apparatus, it is possible to obtain a high power transmission efficiency even in a state where the center axis of the power transmission coil and the center axis of a power reception coil are misaligned in the first direction. In addition, the widths of the outer and inner shapes of the first coil pattern in the second direction are enlarged at substantially the center portions thereof in the first direction, and the inner shape ratio is larger than the outer shape ratio, so that it is possible to suppress reduction in power transmission efficiency in a state where the center axis of the power transmission coil and the center axis of the power reception coil are aligned.

In the present disclosure, the ratio of the inner shape ratio relative to outer shape ratio may be 1.2 or more. This can more effectively suppress reduction in power transmission efficiency in a state where the center axis of the power transmission coil and the center axis of the power reception coil are aligned.

In the present disclosure, the width of the inner shape of the coil pattern in the first direction may be larger than the second inner width. This makes it possible to obtain a high power transmission efficiency even when the center axis of the power transmission coil and the center axis of the power reception coil are significantly misaligned in the first direction.

In the present disclosure, a plurality of turns constituting the first coil pattern may each include: first and second winding areas whose extending direction going from the outer peripheral end to the inner peripheral end changes by 180°; a third winding area whose extending direction coincides with the first direction; a fourth winding area whose extending direction has a predetermined angle with respect to the first direction and linearly connecting one end of the first winding area and one end of the third winding area; and a fifth winding area whose extending direction has a predetermined angle with respect to the first direction and linearly connecting one end of the second winding area and the other end of the third winding area. This can minimize a change in power transmission efficiency caused according to an offset amount between the center axis of the power transmission coil and the center axis of the power reception coil.

In the present disclosure, the plurality of turns may each be smaller in length in the fourth and fifth winding areas than in the third winding area. This makes it possible to enlarge the inner shape while suppressing increase in the entire size.

In the present disclosure, the plurality of turns may each be radially divided into a plurality of lines by a spiral-shaped slit. This makes uniform the density distribution of current flowing in the first coil pattern, allowing a reduction in DC resistance and AC resistance.

The coil component according to the present disclosure may further include a spiral-shaped second coil pattern provided on the other surface of the substrate, the plurality of turns constituting the second coil pattern may each be divided radially into a plurality of lines by a spiral-shaped slit. The innermost turn constituting the first coil pattern may include a first line and a second line positioned outside the first line, and the innermost turn constituting the second coil pattern may include a third line and a fourth line positioned outside the third line. The inner peripheral end of the first line and the inner peripheral end of the fourth line may be connected to each other through a first connection part penetrating the substrate, and the inner peripheral end of the second line and the inner peripheral end of the third line may be connected to each other through a second connection part penetrating the substrate. This cancels a difference between inner and outer peripheries of the first coil pattern and a difference between inner and outer peripheries of the second coil pattern, thereby allowing further reduction in DC resistance and AC resistance.

Thus, when being used for a wireless power transmission apparatus, the coil component according to the present disclosure can exhibit a high power transmission efficiency even in a state where the center axis of a power transmission coil and the center axis of a power reception coil are aligned with each other.

EXAMPLES

A coil component of Example 1 having the same configuration as the coil component 1 according to the above disclosure was produced, and a sintered ferrite having a relative permeability of 1000 and a thickness of 0.5 mm was disposed at the surface 12 side of the substrate 10, and a power reception coil was disposed at the surface 11 side of the substrate 10. The power reception coil was a circular coil having an outer shape of 40 mm and an inner shape of 10 mm and disposed spaced apart from the coil component of Example 1 by 4 mm. Another sintered ferrite having a relative permeability of 1000 and a thickness of 0.5 mm was disposed at an opposite side of the coil component of Example 1. The outer widths and inner widths in Example 1 were set as follows.

outer width Wx2out: 80 mm
outer width Wx1out: 40 mm
outer width Wy2out: 60 mm
outer width Wy1out: 50 mm
inner width Wx2in: 32 mm
inner width Wx1in: 20.1 mm
inner width Wy2in: 12 mm
inner width Wy1in: 2 mm Thus, the outer shape ratio Rout was 1.2, the inner shape ratio Rin was 6, and Rin/Rout was 5.00.

For the coil component of Example 1 having such parameters, a magnetic coupling was measured under conditions that the center axis of the power reception coil was aligned with the center axis of the coil component and that the center axis of the power reception coil was offset from the center axis of the coil component by 20 mm in the x-direction.

A coil component of Example 2 having the same parameters as the coil component of Example 1 except that the inner shape widths were set as follows was produced, and the magnetic coupling was measured under the same conditions as set in Example 1.

inner width Wx2in: 37 mm
inner width Wx1in: 22.2 mm
inner width Wy2in: 17 mm
inner width Wy1in: 7 mm Thus, the inner shape ratio Rin was 2.43, and Rin/Rout was 2.02.

A coil component of Example 3 having the same parameters as the coil component of Example 1 except that the inner shape widths were set as follows was produced, and the magnetic coupling was measured under the same conditions as set in Example 1.

inner width Wx2in: 50 mm
inner width Wx1in: 27.6 mm
inner width Wy2in: 30 mm
inner width Wy1in: 20 mm Thus, the inner shape ratio Rin was 1.5, and Rin/Rout was 1.25.

A coil component of Example 4 having the same parameters as the coil component of Example 1 except that the inner shape widths were set as follows was produced, and the magnetic coupling was measured under the same conditions as set in Example 1.

inner width Wx2in: 53 mm
inner width Wx1in: 28.8 mm
inner width Wy2in: 33 mm
inner width Wy1in: 23 mm Thus, the inner shape ratio Rin was 1.43, and Rin/Rout was 1.2.

A coil component of Example 5 having the same parameters as the coil component of Example 1 except that the inner shape widths were set as follows was produced, and the magnetic coupling was measured under the same conditions as set in Example 1.

inner width Wx2in: 60 mm
inner width Wx1in: 31.7 mm
inner width Wy2in: 40 mm
inner width Wy1in: 30 mm Thus, the inner shape ratio Rin was 1.33, and Rin/Rout was 1.11.

A coil component of Comparative Example 1 having the same structure as the coil component 1*a* of the comparative example illustrated in FIG. 8 was produced, and the magnetic coupling was measured under the same conditions as set in Example 1. The outer widths and inner widths in Comparative Example 1 were set as follows.

outer width Wx2out: 80 mm
outer width Wy2out: 60 mm
inner width Wx2in: 60 mm
inner width Wy2in: 40 mm The measurement results are shown in FIG. 10. As can be seen from FIG. 10, in the coil component of Comparative Example 1, the magnetic coupling obtained when the center axis of the power reception coil is aligned with the center axis of the coil component ("free from offset" in FIG. 10) lowers by 18% as compared to when the center axis of the power reception coil is offset from the center axis of the coil component by 20 mm, while in the coil components of Examples 1 to 5, such lowering of the magnetic coupling is suppressed. In particular, in the coil components of Examples 1 to 4 having a Rin/Rout of 1.2 or more, the magnetic coupling does not lower.

What is claimed is:

1. A coil component comprising:

a substrate; and a spiral-shaped first coil pattern provided on one surface of the substrate, wherein outer and inner shapes of the first coil pattern are both larger in width in a first direction than a second direction perpendicular to the first direction, wherein the outer shape of the first coil pattern has a pair of first outer shape sections having a first outer width in the second direction and a second outer shape section positioned between the pair of first outer shape sections in the first direction and having a second outer width in the second direction that is larger than the first outer width, wherein the inner shape of the first coil pattern has a pair of first inner shape sections having a first inner width in the second direction and a second inner shape section positioned between the pair of first inner shape sections in the first direction and having a second inner width in the second direction that is larger than the first inner width, and wherein an inner shape ratio which is a ratio of the second inner width relative to the first inner width is larger than an outer shape ratio which is a ratio of the second outer width relative to the first outer width.

2. The coil component as claimed in claim 1, wherein a ratio of the inner shape ratio relative to outer shape ratio is 1.2 or more.

3. The coil component as claimed in claim 1, wherein a width of the inner shape of the coil pattern in the first direction is larger than the second inner width.

4. The coil component as claimed in claim 1, wherein a plurality of turns constituting the first coil pattern each includes:

first and second winding areas whose extending direction going from an outer peripheral end to an inner peripheral end changes by 180°;

a third winding area whose extending direction coincides with the first direction;

a fourth winding area whose extending direction has a predetermined angle with respect to the first direction and linearly connecting one end of the first winding area and one end of the third winding area; and a fifth winding area whose extending direction has a predetermined angle with respect to the first direction and linearly connecting one end of the second winding area and other end of the third winding area.

5. The coil component as claimed in claim 4, wherein each of the plurality of turns is smaller in length in the fourth and fifth winding areas than in the third winding area.

6. The coil component as claimed in claim 1, wherein each of a plurality of turns constituting the first coil pattern is radially divided into a plurality of lines by a spiral-shaped slit.

7. The coil component as claimed in claim 6, further comprising a spiral-shaped second coil pattern provided on other surface of the substrate, wherein a plurality of turns constituting the second coil pattern are each divided radially into a plurality of lines by a spiral-shaped slit, wherein an innermost turn constituting the first coil pattern includes a first line and a second line positioned outside the first line, wherein an innermost turn constituting the second coil pattern includes a third line and a fourth line positioned outside the third line, wherein an inner peripheral end of the first line and an inner peripheral end of the fourth line are connected to each other through a first connection part penetrating the substrate, and wherein an inner peripheral end of the second line and the inner peripheral end of the third line are connected to each other through a second connection part penetrating the substrate.

* * * * *